May 12, 1970 CHUTA AIKAWA 3,511,939
LOCAL-CALL PAY TELEPHONE ARRANGED FOR KEY-ENABLED TOLL CALLS
Filed March 20, 1967 4 Sheets-Sheet 1

INVENTOR.
CHUTA AIKAWA
BY
Stephen H. Frishauf
ATTORNEY

LOCAL-CALL PAY TELEPHONE ARRANGED FOR KEY-ENABLED TOLL CALLS

INVENTOR.
CHUTA AIKAWA
BY Stephen H. Frishauf
ATTORNEY

LOCAL-CALL PAY TELEPHONE ARRANGED FOR KEY-ENABLED TOLL CALLS

INVENTOR.
CHUTA AIKAWA
BY Stephen H. Friskauf
ATTORNEY

LOCAL-CALL PAY TELEPHONE ARRANGED FOR KEY-ENABLED TOLL CALLS

Filed March 20, 1967

4 Sheets-Sheet 4

INVENTOR.
CHUTA AIKAWA
BY Stephen H. Frishauf
ATTORNEY 3,511,939

LOCAL-CALL PAY TELEPHONE ARRANGED FOR KEY-ENABLED TOLL CALLS

Chuta Aikawa, Tokyo, Japan, assignor to Tamura Electric Works Ltd., Tokyo, Japan, a corporation of Japan Filed Mar. 20, 1967, Ser. No. 624,349
Int. Cl. H04m 17/02
U.S. Cl. 179—90 3 Claims

ABSTRACT OF THE DISCLOSURE

A pay phone for local calls only; has a counter mechanism associated with the dial to sense prohibited digits (e.g., "1" or "0") in specific positions within a telephone number and to disable the phone when a toll call is attempted; a key-operated switch overrides the disabling circuit to permit key-holders to make unlimited calls.

The present invention relates to a coin telephone, and more particularly to a combination pay and general subscriber telephone set, capable of operating either as a pay station, or upon insertion and operation of a key, as a general subscriber set.

In certain installations it is desirable to have a general subscriber set, capable of making outgoing calls to any other extension available within the telephone network, that is both local and long distance; capable of receiving incoming calls from anywhere; and at the same time, also being capable of operating as a coin phone capable of handling local calls only upon insertion of a coin. Such telephones are particularly useful in restaurants. coffee shops, or other public places which do not have the space or the facilities for a separate telephone booth; where the subscriber needs a telephone for his own use but also may wish to provide pay station telephone service to some of his customers. Since the vast majority of telephone calls are local calls, then, under such conditions, it is sufficient that for customers the coin service for local calls be provided. For the subscriber, the use of the telephone should be free and unrestricted; for other customers, a restriction to local calls is not objectionable. When such a telephone is installed it is necessary, however, that the telephone include a mechanism to prevent a customer making toll, or long distance calls after having inserted merely the amount for a local call.

It is an object of the present invention to provide a telephone which adaptable to provide subscriber services similar to a private business subscriber and, at the same time, to function as a pay station for local calls only.

Toll, or long distance calls made by direct dialing require dialing of an area code, which contains a certain digit in a predetermined position within the number; for example, an area code 202 may be assigned to Washington; 212 to New York; 312 to Chicago; and 415 to San Francisco. The second digit will be either a ONE or a ZERO. Other systems of direct long distance dialing are known; for example, several European systems utilize as the first digit a zero which connects the subscriber station to a separate long distance dialing circuit within the telephone exchange. The telephone set, according to the present invention, therefore must have a means to detect a certain digit which may be called a prohibited digit if the making of long distance calls at the price of a local call is to be prevented.

The digit which is the prohibited digit, such as a ZERO, or a ZERO and a ONE, must, additionally, prevent connection only when it occurs in a predetermined position within the sequence of a number. Thus, the subscriber's telephone number may contain a ONE or a ZERO somewhere within the number, and not as a part of the area code. Therefore, the set must have means to prevent disabling of the set when a prohibited digit is dialed which is in a position other than the predetermined position within the telephone number.

Briefly, in accordance with the present invention, a combination pay and general subscriber telephone service is provided which has a sensing means operatively associated with the dial assembly to sense dialing of a prohibited digit in a particular sequential place within a telephone number. The telephone circuit contains a contact which is controlled by the sensing means to disable connection of the telephone set to the telephone system if the sensing means senses a prohibited digit in a particular assigned place within the telephone number. Additionally, the set is provided with manually, preferably key operated means which are connected into the circuit and, upon operation of the key, switch the circuit to a regular subscriber telephone circuit and prevent disabling of the connection of the set to the telephone line regardless of the number being dialed. According to the feature of the invention, the dial has a camming means associated therewith which is positioned to have a predetermined relation with respect to the position of the prohibited digit on the dial. A cooperating cam part, such as a link, can then be engaged when the camming means is moved by the dial to the position of the prohibited digit, and resulting link motion may be used to control the connection means, such as a switch. In order to provide for sensing of the prohibited digit in a particular place within the telephone number itself, the dial can be provided with a ratchet, Geneva movement or the like, counting the number of dial operations, and the camming means, or the link, can then be shifted to prevent engagement of the camming means and the link unless the dial has been operated the proper number of times, before the link will disable operation of the telephone set, having detected a prohibited number in a particular predetermined place.

The structure, organization and operation of the invention will now be described more specifically in the following detailed description with reference to the accompanying drawings, in which:

FIGS. 1*a* and 1*b* are front and rear pictorial views of the telephone, according to the present invention, in its housing;

Figure 4A:
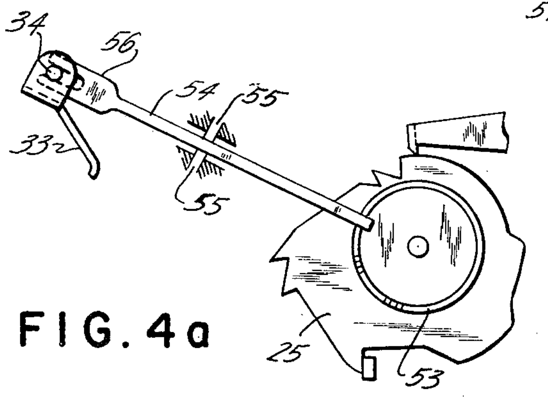
Figure 4B:
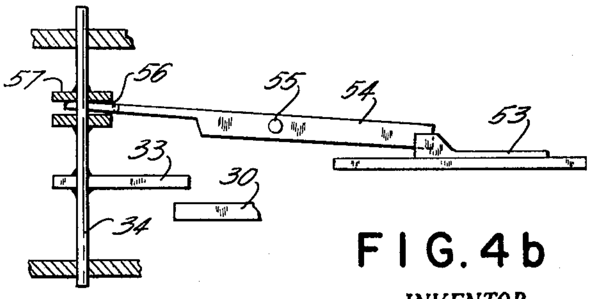
Figure 3:
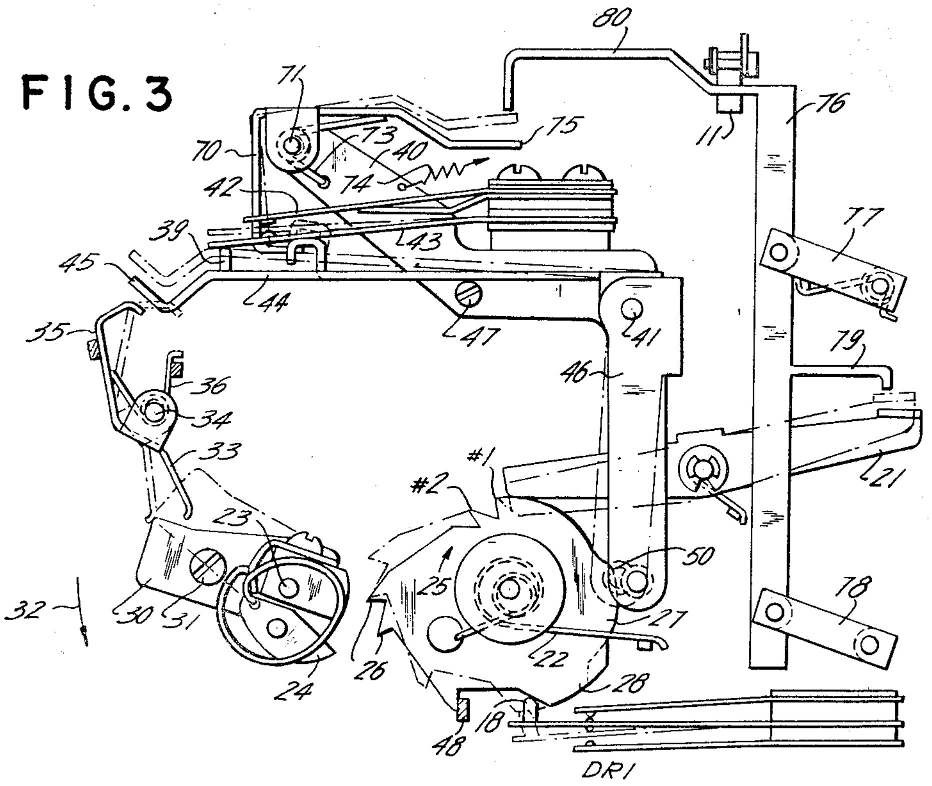
FIG. 3 is an illustration of the mechanism detecting a prohibited digit, and FIG. 3*a* a detail thereof.
Figures 5D, 5E:
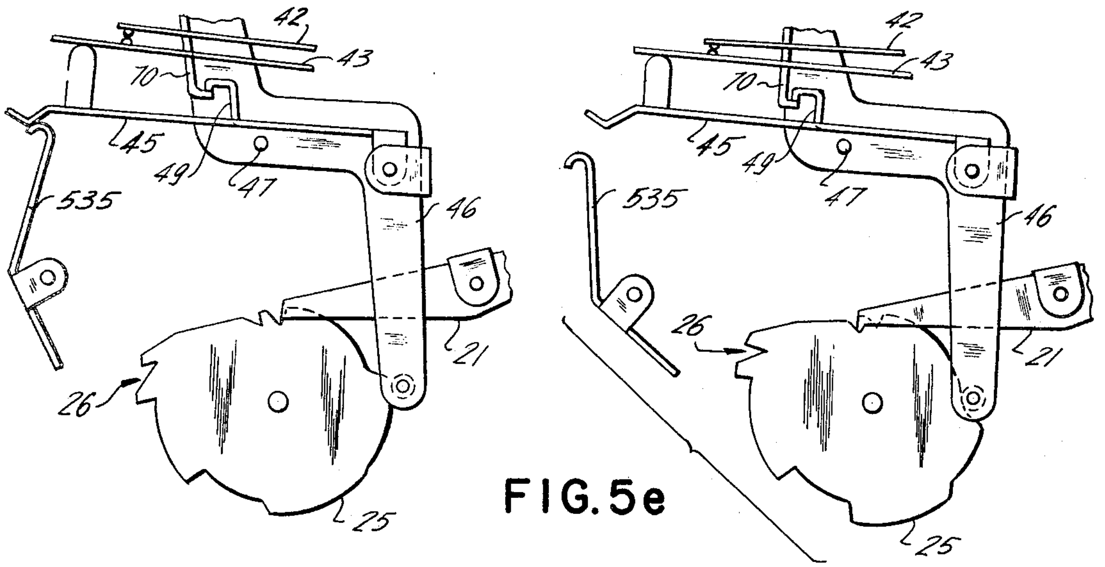
Figure 6A:
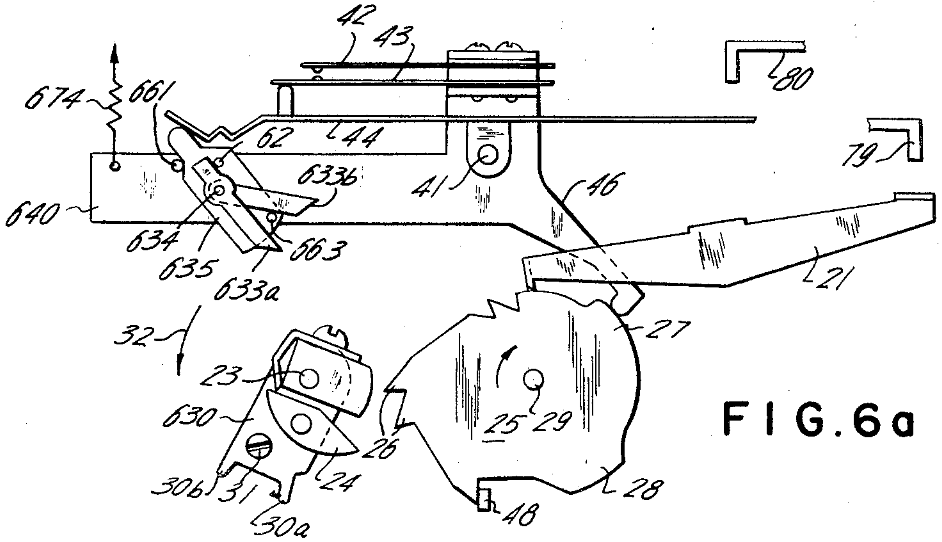
Figure 6B:
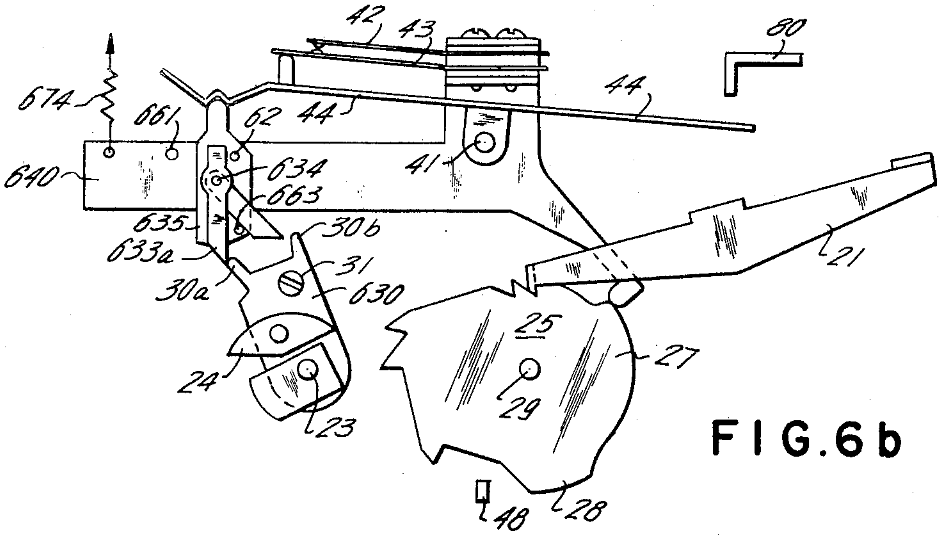
Figure 6C:
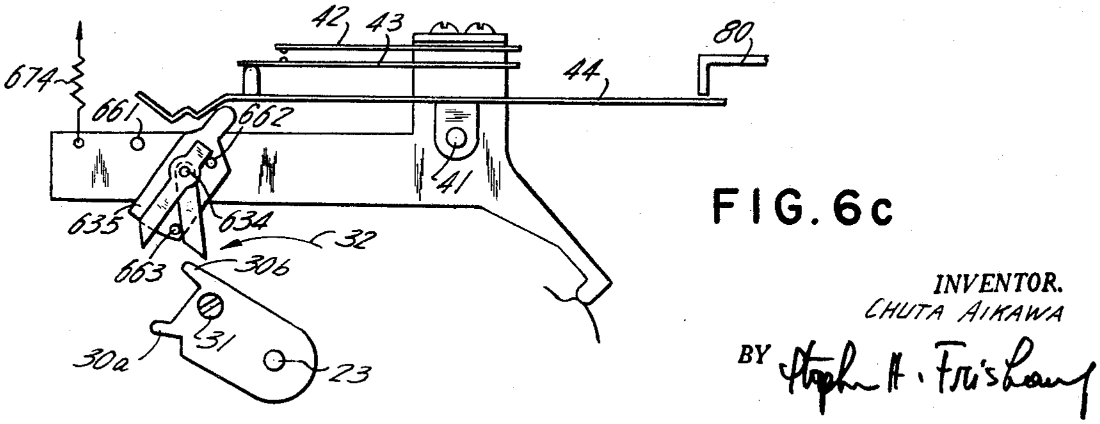

FIGS. 4*a* and 4*b* are top, and side views respectively, of a mechanism detecting a particular location of a number being dialed;

FIGS. 5*a*, 5*b*, 5*c*, 5*d* and 5*e* illustrate various operated states of mechanism in FIG. 3; and FIGS. 6*a*, 6*b* and 6*c* show an arrangement to detect various prohibited digits in the same predetermined position in a telephone number.

Figures 1A, 1B, 2:
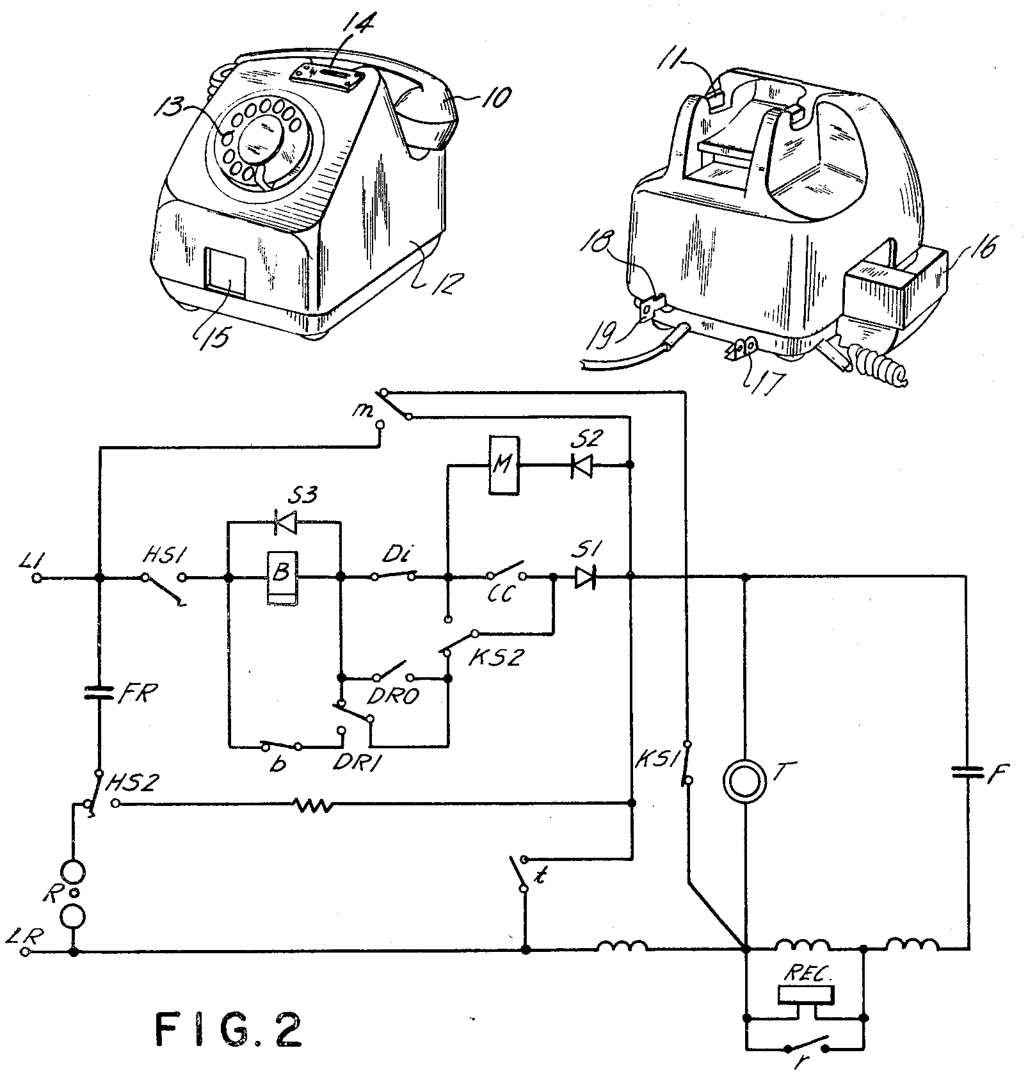
FIG. 2 is a circuit diagram of the telephone set.

The drawings are schematic, and all parts well known in the art, as well as those parts not necessary to an understanding of the inventive concept, have been omitted. a FIG. 1 illustrates conventional parts of the telephone; a hand set 10, normally resting in its cradle, depresses hand set buttons 11 which control the customary switch, referred to as the hook switch in the telephone art. In front of the body 12 of the telephone is a dial 13. A coin slot 14 is above the dial; below the dial is a movable cover plate 15 from which returned coins can be removed. The side of the telephone body 12 is not solid. but contains a cutout in which a slide drawer 16 is fitted. A lock device 17 for the slide drawer 16 is provided on the rear side of the telephone body 12 so that the slide drawer 16 can be removed from the telephone body 12 only upon use of a special key preferably also involving breakage of a seal. The money from customers making local pay-calls is collected therein. Shown in FIG. 1*b* is a key hole 18, through which a key 19 can be inserted to change the telephone from pay station operation to general subscriber use. Upon use of key 19, contacts $KS_1$ and $KS_2$ are operated in the circuit shown in FIG. 2.

Before considering the mechanism of the telephone in detail, it is of advantage to discuss the circuit in connection with FIG. 2, and to establish the operation of the telephone in accordance with the various modes of use. FIG. 2 illustrates line terminals L1, L2, having a cross connection through a condenser FR and a ringer, R. The line terminal L1 is then connected to a hook switch HS–1; then through the coil of a slow-releasing relay B; relay B has contact *b* and is shunted by a rectifier S3. In series with relay B are the dial contacts, schematically incated at Di. Switch CC is operated by the coin insertion mechanism as known in the art, and normally in the position shown; it changes over upon insertion of a coin. Rectifier S1 is for use with a polarized system. The hook switch also has contacts HS–2. A relay M, in series with a rectifier S2, operates contacts *m*.

Switches KS1, KS2 are operated by insertion of the key 19, normally under control of the subscriber. They are shown in FIG. 2 in their normal position, that is when the telephone is available for use as a general subscriber telephone with the key 19 inserted. The contact DR1 is operated upon motion of the dial away from its rest position. Contact DR0 is connected to the sensing mechanism to sense a prohibited digit occurring in a prohibited position within the telephone number. The telephone transmitter is schematically indicated at T, the receiver at REC; inductance coils and receiver and transmitter shorting switches *r*, *t*, complete the circuit, and are provided to prevent transmission of clicks into the receiver when the dial is operated.

The operation of the circuit will best be understood by considering its function. When hand set 10 is lifted from the cradle, and hook switches HS1, HS2 close, the following circuit will be established:

L1-HS1-B-DR1 (normal)-KS2 (normal)-S1
-*m* (normal)-KS1-L2 (Circuit 1)

As soon as relay B operates, contact *b* is broken. The dial tone will be heard at this time. Upon depositing of a coin in the coin slot 14, coin contact CC will operate. This contact CC is held mechanically and will remain in its operated position until the hand set is replaced on the cradle. The deposited coin is stored in the coin mechanism of the telephone, which may be any mechanism well known in the art. The following circuit will then be established;

L1-HS1-B—Di-CC—S1-*m*-KS1-Inductance Coil-L2
└DR1-KS2┘ (Circuit 2)

The transmitter T, however, is short circuited by Circuit 3:

-*m* (normal)-KS1- (Circuit 3)

Upon operation of the dial away from the rest position, that is upon initiating a call to another subscriber, contact DR1 is operated and held mechanically. Contact DR0, however, is not operated since the first digit of subscriber's number will be other than ZERO. Consequently, the dial pulses are sent through Circuit 4:

L1-HS1-B—Di-CC-S1-*t*-L2 (Circuit 4)

Relay B will not release during normal dialing since the relay is designed to have a slow release time. Preferably, the release time of the relay is larger than the time taken for the sequential occurrence of several dialing pulses, and is matched to the time of drop out of a line at the central exchange. Contacts *t*, *r*, ordinarily are also operated by the dial and short circuit the receiver and transmitter during dialing. When the called party answers, reverse current is supplied from the exchange to the calling side telephone and relay M is operated through the Circuit 5:

L1-HS1—S3—Di-M-S2-*m*-KS1-Inductance Coil-L2
└B┘ (Circuit 5)

Relay M has a mechanical interconnection to cause the coin to be guided through a coin chute to collection drawer 16. At the same time, contact *m* of the relay M, operates, short circuiting relay B, dial impulse contact and relay M, so that a direct circuit from line L1, L2 is established:

L1-*m* (operated)-T-Inductance Coil-L2 (Circuit 6)

When the hand set is replaced after the conversation is finished, all operating contacts and mechanisms restore to normal position. If the called party did not answer, then the previously deposited coin is returned to the coin return opening behind return plate 15 when the handset button 11 is pushed down by replacing the hand set. All operated contacts and mechanisms are restored to the normal position, as known in the art.

If the user should attempt to dial a toll call, having a prohibited digit in a predetermined position after depositing the money for a local call, and without using the key which operates contacts KS1, KS2, then contact DR0 is closed and held mechanically. Thus the dialing contact Di is short circuited and no dial impulses will be sent out upon return spin of the dial. The telephone cannot be used until the handset has been replaced first, causing a mechanical interlock (to be described later) to release and hook switches HS1, HS2, to open. Consequently, the user cannot send the dial impulses for a toll call having a prohibited digit in a predetermined position without using KS Key.

If the user should try to cut the loop circuit which was formed by dialing an initial digit other than a prohibited digit, in a predetermined position, by improperly holding the dial contact Di open for a long time, the exchange equipment will release the connection established by the first sent impulses. Sequential numbers cannot be disabled because the relay B will restore before the control equipment will be restored. The contact "*b*" and contact "DR1" operated by the first windup motion of the dial form the short circuit below.

B-------------Di-------------CC---------------
└--*b*--D R1 (operated)--K S 2 (normal)--┘
(Circuit 7)

Consequently, all improper handling is impossible in this telephone.

If the subscriber wishes to make a call by use of the key 19, switch contacts KS1, KS2, will change over to the position not shown in the drawing; as the hand set is lifted, the following Circuit 8 will be established:

L1-HS1-B-Di-KS2 (operated)-S1-T-Inductance Coil-L2
(Circuit 8)

A local call, therefore, will be made without depositing a coin as the coin contact CC is short circuited by operated contact of KS2. If an attempt is made to place a second local call after depositing a coil for only a first call, it will be possible to call up a called party or a second local call after depositing a coin for only a cause reversal battery is not supplied even if the called party answers, transmission from the calling party to the answering party in inhibited since the transmitter is shunted as in the above-described Circuit 3. Consequently, an improper free call from this telephone is impossible without using the KS Key.

In the casing of incoming calls, the Ringer provided in the telephone rings through the following circuit.

L1-Condenser FR-HS2 (normal)-Ringer R-L2
(Circuit 9)

When the handset is removed, reverse current flows instantaneously through the Circuit 5, above, and the relay M is operated. Accordingly, the talking circuit becomes the same as Circuit 6.

The particular mechanism of coin collection, and coin return is not described or disclosed because such mechanisms are known in the art; the inventive concept is particularly directed to control of the contacts DR1 and DR0, which, together, sense dial operation and dialing of a prohibited digit in a particular position of a telephone number.

Referring now to FIG. 3, the main dial 13 is mounted on a shaft 23, and provided with the usual mechanism forming the contacts Di, and a return, constant velocity mechanism, not shown in the drawings and known in the art. Shaft 23 has attached thereto a pawl 24. Pawl 24 is arranged to engage tooth 26 of a ratchet wheel 25 and move the ratchet wheel by one step each time that the dial 13, that is shaft 23, is operated. Associated with shaft 23, and rotatable thereover, is a cam 30, located in a particular position which is fixed to the main gear of the dial (not shown in FIG. 3), for example by screw 31. Cam 30 can engage a link lever 33 when the dial is wound up to a particular prohibited digit, such as for example all the way to reach digit ZERO. A contact operating lever 44 is controlled by idle lever 35, fixed to rotate with the link 33. The idle lever 35 is pivoted over a pivot 34 and is controlled by cam 30 being rotated to an angle that is defined by the prohibited digit. Sensing of the particular digit occurs during the wind-up operation of the dial, that is in the direction of the arrow 32, FIG. 3. Movement of the cam 30 from the solid line position to the dotted line position causes rocking of link 33 over pivot 34, and movement of idle lever 35, connected to link 33, from the solid line position to the dotted line position.

A contact carrier 40 formed as a movable lever which is capable of pivoting over a pin 41, has a pair of spring contacts 42, 43, mounted thereon. Contacts 42, 43 are the mechanical equivalent of contact DR0, FIG. 2. Likewise pivoted about pivot 41 is an operating lever 44 having a bent end 45 adapted to be engaged by idle lever 35; it can be seen that when the idle lever moves from its ordinary, full-line position to its operated, dashed-line position, it will raise end 45 of lever 44, thus causing closing of contacts 42, 43 and thus closing contacts DR0 since insulating stud 39 secured on the operating lever 44 pushes upon the contact spring 43. Thus, when a prohibited digit has been sensed, the dial mechanism is short-circuited if key switch contact KS2 is not operated.

If a prohibited digit is part of a telephone number, then a means must be provided to prevent disabling of the telephone upon sensing of such a prohibited digit. This means is generally the combination of camming surfaces 27, 28 on ratchet wheel 25 cooperating with a cam follower extension 46 on contact carrier 40. Cam follower extension 46, integral with or secured to contact carrier 40, rides against cam 27 of ratchet 25. Initially, before dialing at all, extension 46, and with it contact carrier 40 and contacts 42, 43 forming switch DR0, is in the solid line position. Upon rotation of dial 13, ratchet wheel 25 is moved one step by means of pawl 24 and teeth 26. The ratchet wheel 25 will be put into the position shown by the dotted lines. Cam follower extension 46 has not changed position because the rise 27, even after ratchet 25 has stepped for one notch, will maintain cam follower extension 46 as shown by the solid lines. Thus, if the first digit is not a prohibited digit, such as a ZERO, the dial impulses can be transmitted. If the first digit is, however, a prohibited digit, then the mechanism including cam 30, idle lever 35 and operating lever 44 will close contacts 42, 43 and inhibit sending of pulses. As the second digit is being dialed, ratchet 25 will step one more notch, beyond the dotted line position. In that position, it will be held against return under influence of a return spring 22, by a stop pawl 21, which will have moved from its rest, or solid line position to the dotted position. As the ratchet 25 moves beyond the dotted line position, cam follower extension 46 can pivot over pin 41 to the left in the drawing FIG. 3. Pivoting to the left will raise contact carrier 40, thus raising both contact springs 42, 43. If idle lever 35 now moves to the right, that is to the dotted line position because a prohibited digit is being dialed, idle lever 35 will not engage the bent 45 end of operating lever 44, because lever 44 itself will have moved to the dotted line position shown; thus, lever 44, being free to pivot over pin 41 is held away from engagement with idle lever 35, and dialing of a prohibited digit in a position other than the desired position is enabled because the disabling feature of contact DR0 are rendered ineffective. The lower limit of motion of lever 44 is given by a pin, or screw 47 secured to contact carrier 40. Preferably, lever 44 is spring loaded.

The normal, or stop position of ratchet wheel 25 is given by engagement of the ratchet wheel with a stop provided on the support for the entire mechanism, shown schematically only at 48, and engaging a tooth of ratchet wheel 25. The DR1 contact is located on the support for the assembly, not shown, and operated by movement of the dial beyond its rest position, by engagement of camming surface 28 with a contact extension 18 on the DR1 contact. Engagement of camming surface 28 with extension 18 will shift the contact from the solid line position shown, that is the rest position, to the dotted position. Upon further motion of the dial, that is for example dialing of a third number, ratchet wheel 25 will no longer change position because of the relieved surface beneath teeth 26. Of course, should it not be desired to enable dialing of a prohibited digit in the second position, then ratchet wheel 25 will have to have three teeth 26, three stops engaging stop pawl 21, and suitably enlarged profiles of camming surfaces 27, 28. Other combinations of prohibited digits and number positions will readily occur to a designer skilled in the art.

If the prohibited digit occurs in a position which is not the first, such as an area code of the type utilized for Washington, that is "202," then it is sufficient to provide a suitable modification of the camming surface 27 by extending the caming surface to the position shown in the dash dotted line 50. This will prevent rocking of cam follower extension 46, to the left, and thus disabling of the operation of contacts DR0 prematurely. It may be necessary, however, simultaneously to provide a means to enable dialing of a first, or prior ZERO, for example to alert the telephone operator. In order to prevent sensing of an initial prohibited digit, such as a ZERO, the mechanism shown in FIGS. 4*a*, 4*b* may be provided. Referring to FIG. 4 collectively, where only the disabling of the prohibited digit sensing mechanism is shown, ratchet wheel 25 is provided with a camming track 53 on one face thereof. A disabling lever 54, pivoted in the housing at 55, and maintained by a spring, not shown, against the camming tract 53, is provided with a forked end 56 engaging a notch in the shoulder 57 formed in pin 34. Upon rocking of the lever 54 in a clockwise direction, that is into the position shown in FIG. 4*b*, link 33 will be moved out of possible engagement with cam 30 and thus operation of contacts DR0 by engagement of idle lever 35 with operating lever 44 is prevented.

Figure 3A:
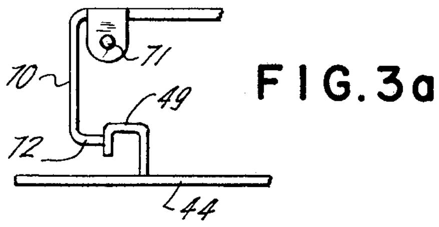
Figure 5A:
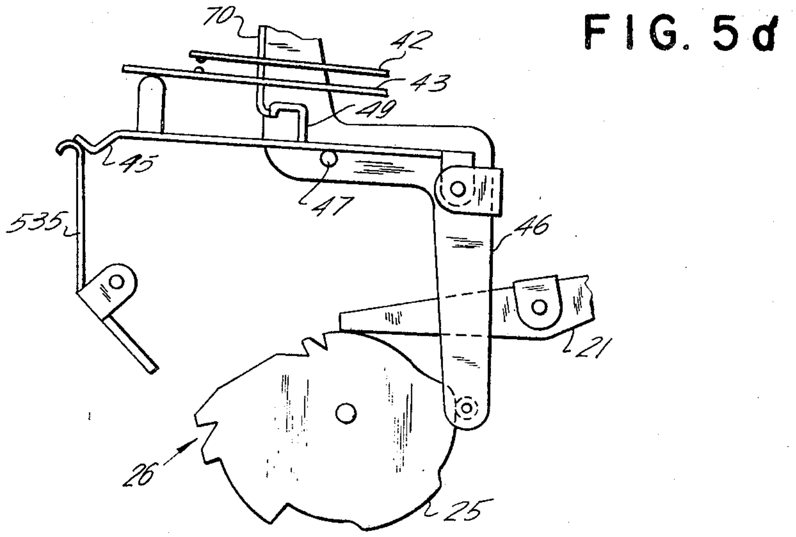
Figures 5B, 5C:
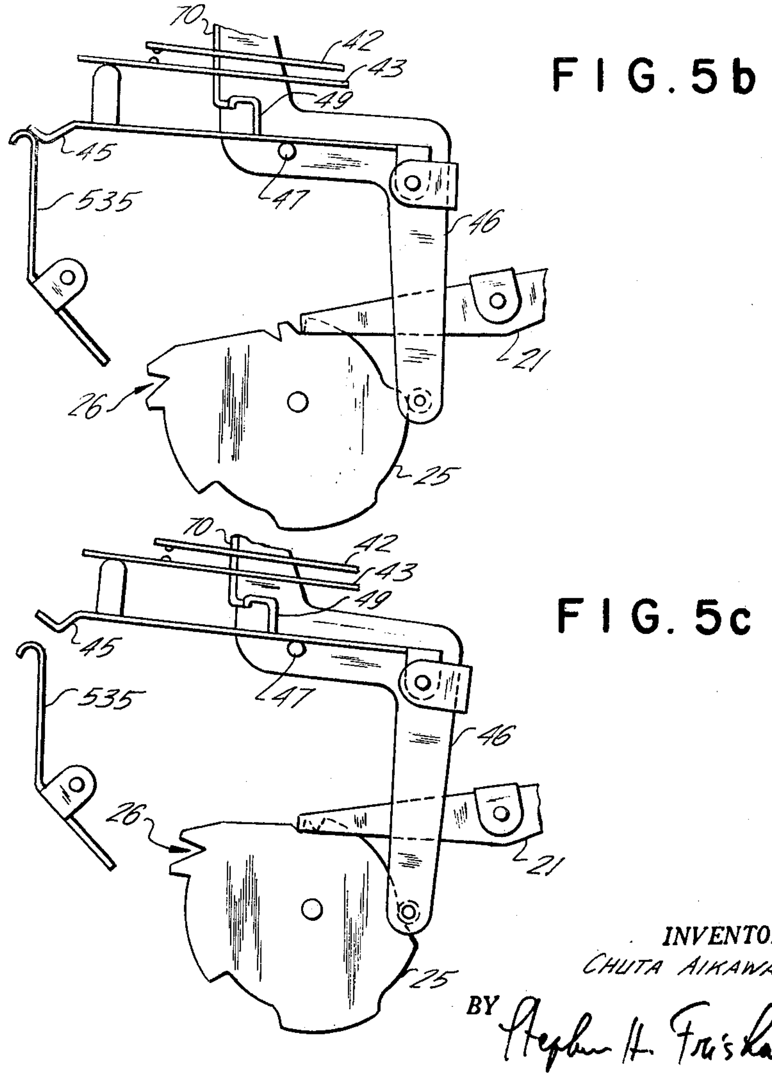

In order to prevent opening of Contacts DR0, that is contact springs 42, 43, after the idle lever 35 has raised operating lever 44, a locking mechanism consisting of a locking lever 70, pivoting over a pin 71 and having a hooked end 72 is provided (see FIG. 3*a*). Operating lever 44 is provided with a notched projection 49 which, ordinarily, matches the end hook 72 of locking lever 70. If lever 44 is raised, locking lever 70 can slip under the notch of projection 49 and maintain the projection in raised position, thus keeping the contacts 42, 43 closed.

A spring 73, biases the locking lever 70 for engagement under the projection 49. Operating lever 44, and its cam follower extension 46, is biased for engagement with ratchet wheel 25 by means of a spring 74. The locking lever 70 has an extension 75. The entire mechanism is reset by depressing release lever 76, secured for up and down motion by spring biased links 77, 78. Release lever 76 is connected for operation by the handset buttons 11, as schematically indicated. The release lever 76 has operating extensions 79, 80, engaging stop pawl 21 and locking lever extension 75, respectively, to reset the mechanism upon downward motion of the release lever 76 when the handset is replaced. Upon such downward motion, stop pawl 21 will rock clockwise, releasing engagement with the ratchet wheel 25 and permitting the ratchet wheel to return to its normal position as shown by the full lines in FIG. 3, under influence of spring 22. Likewise, locking lever 70 will return to its position in which the hook 72 matches projection 49 by engagement with the operating extension 80, thus assuring that contacts DR0 are open and permitting dialing of any digit.

The FIGS. 5 show various conditions of the camming mechanism and sensing mechanism in the embodiment illustrated in FIG. 3, and an alternate, illustrative form of idle lever at 535.

FIG. *5a* indicates the condition before the dial is wound up;

FIG. *5b* shows the condition after a number, which is not prohibited to be dialed at the first winding up operation, has been dialed;

FIG. *5c* indicates the condition after the second winding operation of the dial, following the first one as shown in FIG. *5b*;

FIG. *5d* shows the condition when DR0 contact has been closed after a prohibited number is dialed; and FIG. *5e* shows the condition upon dialing a number subsequent to a prohibited digit.

The present invention thus provides a sensing means, consisting of cam 30 and link 33 to sense the dialing of a prohibited digit, in a sequential place within a telephone number. If the sequential place is the first, no further mechanism is necessary; if the sequential place is a different one than the first, a suitable shift mechanism as illustrated in FIG. 4 may be needed, or the cam shape of ratchet wheel 25 should be changed, from that shown in the drawings. A contact means, that is contact DR0 and contact members 42, 43, FIG. 3, is responsive to the sensing means and connected into the telephone circuit in such a manner that the set is effectively disabled from communicating with the telephone line, by short-circuiting the dial contacts Di (FIG. 1) so that communication of the set with another subscriber station cannot take place. The entire mechanism can be overridden electrically by switching over contact KS2, thus effectively removing, electrically, circuits sensing a prohibited digit from being effective. Yet, upon insertion of a proper coin, calls may be made which do not contain the prohibited digit. This mechanism, being standard in the art and including only the coin sensing mechanism and, upon sensing of the coin, an enabling circuit to enable the telephone, is not further shown or described.

The telephone circuit itself, except for the addition of the key-operated contacts KS1, KS2, and the contacts associated with the enabling and disabling mechanism is also standard and may be adapted to any known system. The foregoing embodiment is an example of a mechanism which senses dialing of a prohibited digit which is larger than a preceding permitted digit, either in the first or any other position, for example the "0." If one prohibited digit is an "8," others, e.g., "9" and "0" will also be prohibited.

The case may arise where a mechanism is required which senses only a certain prohibited digit, at either the first or the second dialing operation, but permits higher digits. For example, a mechanism may sense only digit "5" and not sense "1," "2," "3," "4," "6," "7," "8," "9," "0."

The FIGS. 6 show an embodiment for this purpose.

Idle lever 635 is movably mounted on a contact carrier 640 and the idle lever 635, link 633–*a* and 633–*b* are arranged to move with the contact carrier 640. (The locking lever 70, pin 71 and spring 73 shown in FIG. 3 are omitted.) The cam 630, which is fixed to the main shaft 23 of the dial, is now provided with two projections 30–*a* and 30–*b* as shown in FIGS. 6.

Idle lever 635 is rotatably mounted on a pin, 634. A stop 661 is mounted on the contact carrier 640. Link 633–*a* and link 633–*b* are rotatably mounted on the pin 634 and are biased in a clockwise direction around the pin 634 by two springs (not shown). Movement of the links is limited by stops 662 and 663, which are respectively mounted on the idle lever 635. In all other respects, the mechanism is the same as in FIG. 3.

For example, let it be assumed that the cam 30 is set with set screw 31 on a main gear to rotate with main shaft 23 of the dial for sensing prohibited digit "5" in the first wind up operation of the dial. Similar to the case of FIG. 3, a pawl 24 will push the first tooth 26 of ratchet wheel 25 to turn the ratchet for one step around pin 29 in a clockwise direction. At this time, the ratchet is held in this position, since a tooth will be engaged by a stop pawl 21. However, the contact carrier 640 is not yet moved, because the end of extension 46 of the contact carrier 640 has not yet slipped off cam surface 27. When the prohibited digit "5" is wound up, then the first projection 30–*a* of the cam 630 will push link 633–*a*, which in turn engages stop 662 mounted on the idle lever 635. Therefore the link 633–*a* and the idle lever 635 will be rotated around the pin 634 in a clockwise direction and lift operating lever 44 against torque due to a holding spring connected to idle lever 635 (and not shown for clarity). Accordingly, the operating lever 44 will be pushed up by the idle lever 635 and rotate around the pin 41 in clockwise direction to close DR0 contacts 43 and 42. FIG. 6–*b* shows this state.

If a larger digit than the prohibited digit "5" is dialed, for instance "6" as shown in FIG. 6–*c*, then the second projection 30–*b* will push the second link 633–*b* and the idle lever 635 will be rotated around the pin 634 in the clockwise direction and the operating lever 44 will again be pushed down, as shown in FIG. 6–*c*. Naturally DR0 contact 43 and 42 will open. In the spin-back operation, the rotational direction of cam 630 will be inverse to that of arrow mark 32, and projections 30–*b* and 30–*a* will push the end of link 633–*b* to the inverse direction of the arrow mark 32. However, in this case, the link 633–*b*, which is biased by the spring (not shown) as noted, will be free to rotate around the pin 634 in a counterclockwise direction. Therefore, the inverse rotation to that of arrow mark 32, or the spin-back operation for sending dial impulses will not be hindered at all.

If the second wind up operation is done after the first wind-up operation has been done, as shown in FIG. 6–*b* or in FIG. 6–*c*, then the second tooth 26 of ratchet is rotated more for one step by a pawl 24, and a stop pawl 21 further holds the second tooth of the ratchet. Therefore, the extension 44 of the contact carrier 40 will be disengaged from cam surface 27 of the ratchet wheel 25, so that the contact carrier can rotate around the pin 41 under the influence of a spring 674 in a clockwise direction. Accordingly, even though the cam 630 is rotated in the second wind-up operation, the idle lever and links will not be operated, so that the DR0 contact will be kept in the operated state by the first wind-up operation and its position will not change.

When the handset is restored on the handset button, then extension 79 of the release lever will restore the ratchet wheel 25, and extension 80 will push down the right end of operating lever 44, while the left end of the operating lever will rise. And the idle lever 635 will rotate around a pin 634 in a counter-clockwise direction by its restoration spring (not shown), and will come to rest against stop 661 to return to the normal state.

If the prohibited digits make a group of successive digits, like "7," "8," "9," then the setting position of the cam 630 may be changed and the distance of two projections of 30–*a* and 30–*b* may be changed into corresponding distance to three digits.

The sensing of positions of the dial, the ratchet 25 associated therewith, and the mechanical motion engendered thereby, such as due to engagement of projection 30–*b*, link 633–*a*, or engagement of cam follower extension 46 of operating lever 44 with cam 25 can of course also be done electrically; conversion of the electrical sensing to mechanical motion, can readily be done by means of relays, or the like; the actual operating force can be supplied by springs which are wound up when the handset is replaced and which are held compressed until a gear releases the spring as controlled by a magnet. The preferred embodiment showing a mechanical construction has been illustrated since it requires no internal power supply for the set to operate the relays and the mechanical assembly can be readily constructed. Nevertheless, a means sensing the position of the ratchet 25, and a stopping thereof, can readily include an electrical contact rather than camming surface 27, and its possible extension 50 (FIG. 3). Likewise, since a count of dial operation as distinguished from the digit dialed is thus obtained, operation of contacts DR0 by pivoting of idle lever 35 and link 33 or 635 and 633 can be arranged to occur only if the prohibited digit in the particular sequential position within a number is detected, by electrically overriding undesired premature closing of contacts DR0. Such an electrical contact could be inserted in series, electrically, with contact springs 42, 43, and controlled by the position of ratchet 25. The locking lever 70 then, likewise, has to be disabled until the proper digit is dialed; or, alternatively, omitted entirely; or an additional override also controlled by camming surface 27 may be provided.

I claim:

1. Key operated combination pay and general subscriber telephone set adapted for connection to a telephone line comprising a dial assembly coin receiving means; a hand set release hook (11); an internal telephone circuit; means activating said internal telephone circuit upon insertion of a coin and operation of said hand set release hook from a rest to a release position;

sensing means (30, 33, 35; 45, 44) operatively associated with said dial and moved thereby during wind-up of the dial, said sensing means sensing dialing of a prohibited digit in a particular sequential place within a telephone number;

a switch (DR0–42, 43) connected into said circuit to disable communication of said set with the telephone line upon sensing of said prohibited digit in said particular sequential place;

a ratchet (25, 26) in driven relation to said dial to step said ratchet by one tooth for each dialing operation of said dial by any number thereof;

interlock means comprising a camming means (27, 28) associated with said ratchet (25) and a cam follower (50, 46, 44) associated with said camming means, said cam follower rocking (41) upon engagement with said camming means and upon an additional operation of the dial after the number of operations which may include the prohibited digit have been carried out, from a rest position to a rocked position, and holding means (72, 49) retaining said cam follower (46, 44) in rocked position;

said switch (DR0–42, 43) being secured to said cam follower (46, 44) and located thereon for engagement (35–45) by said sensing means when said cam follower (50, 46, 44) is in rest position;

and means (76, 77, 79, 21; 80, 75) interlocked with said release hook and holding said ratchet in position as stepped by the dial after release of said handset release hook from rest position and in accordance with the count of dial operations after such release, and releasing said holding means as well as said ratchet upon movement of said release hook to rest position.

2. Telephone set as claimed in claim 1, including a key operated switch (KS1, KS2) connected in series with said switch (DR0–42, 43).

3. Telephone set as claimed in claim 1, wherein a slow release relay is provided in series with the dial contacts and associated with said hook, to permit transmission of dial impulses through said relay, while providing for drop-out of the relay upon interruption of the telephone circuit for a period of time exceeding dial impulse spacing.

References Cited

FOREIGN PATENTS

| | | |
|---|---|---|
| 401,586 | 11/1933 | Great Britain. |
| 563,931 | 9/1944 | Great Britain. |

KATHLEEN CLAFFY, Primary Examiner

J. S. BLACK, Assistant Examiner

U.S. Cl. X.R.

179—6.3